United States Patent
Sliger et al.

(10) Patent No.: US 8,076,029 B2
(45) Date of Patent: Dec. 13, 2011

(54) LITHIUM CELL WITH IRON DISULFIDE CATHODE AND IMPROVED ELECTROLYTE

(75) Inventors: Michael Sliger, New Milford, CT (US); Nikolai N. Issaev, Woodbridge, CT (US); Eric Navok, Stamford, CT (US); Kenneth E. Yelm, Hamilton, OH (US)

(73) Assignee: The Gillette Company, Boston, MA (US)

( * ) Notice: Subject to any disclaimer, the term of this patent is extended or adjusted under 35 U.S.C. 154(b) by 437 days.

(21) Appl. No.: 12/321,331

(22) Filed: Jan. 20, 2009

(65) Prior Publication Data

US 2010/0183913 A1    Jul. 22, 2010

(51) Int. Cl.
*H01M 4/36*   (2006.01)

(52) U.S. Cl. ............... 429/221; 429/231.1; 429/232; 429/321; 429/322; 429/323; 429/307; 429/327; 429/329; 429/341; 429/245; 429/94; 429/129; 429/249; 429/254; 429/178; 429/176

(58) Field of Classification Search ............... 429/221, 429/231.1, 232, 321, 322, 323, 307, 327, 429/329, 341, 245, 94, 129, 249, 254, 178, 429/176
See application file for complete search history.

(56) References Cited

U.S. PATENT DOCUMENTS

| | | | |
|---|---|---|---|
| 4,228,162 A | 10/1980 | Luzzi | |
| 4,794,057 A | 12/1988 | Griffin | |
| 4,952,330 A | 8/1990 | Leger | |
| 4,959,281 A | 9/1990 | Nishi | |
| 5,229,227 A | 7/1993 | Webber | |
| 5,290,414 A | 3/1994 | Marple | |
| 5,432,030 A | 7/1995 | Vourlis | |
| 5,514,491 A | 5/1996 | Webber | |
| 5,698,176 A | 12/1997 | Capparella | |
| 6,218,054 B1 | 4/2001 | Webber | |
| 6,280,883 B1 | 8/2001 | Lamanna | |
| 6,849,360 B2 | 2/2005 | Marple | |
| 6,866,965 B2 | 3/2005 | Lee | |
| 7,157,185 B2 | 1/2007 | Marple | |
| 2005/0233214 A1 | 10/2005 | Marple | |
| 2005/0244706 A1 | 11/2005 | Wu | |
| 2005/0277023 A1 | 12/2005 | Marple | |
| 2006/0019161 A1 | 1/2006 | Issaev | |
| 2006/0046152 A1 | 3/2006 | Webber | |
| 2006/0046153 A1 | 3/2006 | Webber | |
| 2006/0046154 A1 | 3/2006 | Webber | |
| 2006/0228620 A1 | 10/2006 | Martinson | |
| 2007/0202409 A1 | 8/2007 | Yamakawa | |
| 2008/0026296 A1 | 1/2008 | Bowden | |
| 2008/0050654 A1 | 2/2008 | Stevanovic | |

FOREIGN PATENT DOCUMENTS

| | | | |
|---|---|---|---|
| EP | 0529802 B1 | 4/2000 | |
| WO | WO 2008/012776 A2 | 1/2008 | |

*Primary Examiner* — Laura Weiner
(74) *Attorney, Agent, or Firm* — Vladimir Vitenberg (57) ABSTRACT

A primary cell having an anode comprising lithium and a cathode comprising iron disulfide ($FeS_2$) and carbon particles. The electrolyte comprises a lithium salt dissolved in a solvent mixture which contains 1,3-dioxolane and isosorbide dimethyl ether. The solvent mixture may comprise 1,3-dioxolane, 1,2-dimethoxyethane and additive isosorbide dimethyl ether. The isosorbide dimethyl ether comprises typically between about 2 and 15 percent by weight of the solvent mixture and improves cell service life and performance. A cathode slurry is prepared comprising iron disulfide powder, carbon, binder, and a liquid solvent. The mixture is coated onto a conductive substrate and solvent evaporated leaving a dry cathode coating on the substrate. The anode and cathode can be spirally wound with separator therebetween and inserted into the cell casing with electrolyte then added.

14 Claims, 5 Drawing Sheets

LITHIUM CELL WITH IRON DISULFIDE CATHODE AND IMPROVED ELECTROLYTE

FIELD OF THE INVENTION

The invention relates to lithium cells having an anode comprising lithium and a cathode comprising iron disulfide and an electrolyte comprising a lithium salt, preferably lithium iodide and solvent which includes 1,3-dioxolane and isosorbide dimethyl ether additive.

BACKGROUND

Primary (non-rechargeable) electrochemical cells having an anode of lithium are known and are in widespread commercial use. The anode is comprised essentially of lithium metal. Such cells typically have a cathode comprising manganese dioxide, and electrolyte comprising a lithium salt such as lithium trifluoromethane sulfonate ($LiCF_3SO_3$) dissolved in an organic solvent. The cells are referenced in the art as primary lithium cells (primary $Li/MnO_2$ cells) and are generally not intended to be rechargeable. Alternatively, primary lithium cells with lithium metal anodes but having different cathodes are also known. Such cells, for example, have cathodes comprising iron disulfide ($FeS_2$) and are designated $Li/FeS_2$ cells. The iron disulfide ($FeS_2$) is also known as pyrite. The $Li/MnO_2$ cells or $Li/FeS_2$ cells are typically in the form of cylindrical cells, typically AA size or AAA size cells, but may be in other size cylindrical cells. The $Li/MnO_2$ cells have a voltage of about 3.0 volts which is twice that of conventional $Zn/MnO_2$ alkaline cells and also have higher energy density (watt-hrs per $cm^3$ of cell volume) than that of alkaline cells. The $Li/FeS_2$ cells have a voltage (fresh) of between about 1.2 and 1.8 volts which is about the same as a conventional $Zn/MnO_2$ alkaline cell. However, the energy density (watt-hrs per $cm^3$ of cell volume) of the $Li/FeS_2$ cell is higher than a comparable size $Zn/MnO_2$ alkaline cell. The theoretical specific capacity of lithium metal is high at 3861.4 mAmp-hr/gram and the theoretical specific capacity of $FeS_2$ is 893.6 mAmp-hr/gram. The $FeS_2$ theoretical capacity is based on a 4 electron transfer from 4Li per $FeS_2$ molecule to result in reaction product of elemental iron Fe and $2Li_2S$. That is, 2 of the 4 electrons change the oxidation state of +2 for $Fe^{+2}$ in $FeS_2$ to 0 in elemental iron ($Fe^0$) and the remaining 2 electrons change the oxidation state of sulfur from $-1$ in $FeS_2$ to $-2$ in $Li_2S$.

Overall the $Li/FeS_2$ cell is much more powerful than the same size $Zn/MnO_2$ alkaline cell. That is, for a given continuous current drain, particularly at higher current drain over 200 milliAmp, the voltage is flatter for longer periods for the $Li/FeS_2$ cell than the $Zn/MnO_2$ alkaline cell as may be evident in a voltage vs. time discharge profile. This results in a higher energy output obtainable from a $Li/FeS_2$ cell compared to that obtainable for a same size alkaline cell. The higher energy output of the $Li/FeS_2$ cell is more clearly and more directly shown in graphical plots of energy (Watt-hrs) versus continuous discharge at constant power (Watts) wherein fresh cells are discharged to completion at fixed continuous power outputs ranging from as little as 0.01 Watt to 5 Watt. (As the cell's voltage drops during discharge the load resistance is gradually decreased, raising the current drain to maintain a fixed constant power output.) The graphical plot Energy (Watt-Hrs) versus Power Output (Watt) for the $Li/FeS_2$ cell is above that for the same size alkaline cell. This is despite that the starting voltage of both cells (fresh) is about the same, namely, between about 1.2 and 1.8 volt.

Thus, the $Li/FeS_2$ cell has the advantage over same size alkaline cells, for example, AAA, AA, C or D size or any other size cell in that the $Li/FeS_2$ cell may be used interchangeably with the conventional $Zn/MnO_2$ alkaline cell and will have greater service life, particularly for higher power demands. Similarly the $Li/FeS_2$ cell which is a primary (nonrechargeable) cell can also be used as a replacement for the same size rechargeable nickel metal hydride cell, which has about the same voltage (fresh) as the $Li/FeS_2$ cell. Thus, the primary $Li/FeS_2$ cell can be used to power digital cameras, which require operation at high pulsed power demands.

The cathode material for the $Li/FeS_2$ cell may be initially prepared in a form such as a slurry mixture (cathode slurry), which can be readily coated onto the metal substrate by conventional coating methods. The electrolyte added to the cell must be a suitable organic electrolyte for the $Li/FeS_2$ system allowing the necessary electrochemical reactions to occur efficiently over the range of high power output desired. The electrolyte must exhibit good ionic conductivity and also be sufficiently stable, that is non reactive, with the undischarged electrode materials (anode and cathode components) and also non-reactive with the discharge products. This is because undesirable oxidation/reduction side reactions between the electrolyte and electrode materials (either discharged or undischarged) could thereby gradually contaminate the electrolyte and reduce its effectiveness or result in excessive gassing. This in turn can result in a catastrophic cell failure. Thus, the electrolyte used in $Li/FeS_2$ cell in addition to promoting the necessary electrochemical reactions, should also be stable to discharged and undischarged electrode materials. Additionally, the electrolyte should enable good ionic mobility and transport of the lithium ion ($Li^+$) from anode to cathode so that it can engage in the necessary reduction reaction resulting in $LiS_2$ product in the cathode.

An electrode composite is formed with a sheet of lithium, a sheet of cathode composite containing the $FeS_2$ active material and separator therebetween. The electrode composite may be spirally wound and inserted into the cell casing, for example, as shown in the spirally wound lithium cell of U.S. Pat. No. 4,707,421. A cathode coating mixture for the $Li/FeS_2$ cell is described in U.S. Pat. No. 6,849,360. A portion of the anode sheet is typically electrically connected to the cell casing which forms the cell's negative terminal. The cell is closed with an end cap which is insulated from the casing. The cathode sheet can be electrically connected to the end cap which forms the cell's positive terminal. The casing is typically crimped over the peripheral edge of the end cap to seal the casing's open end. The cell may be fitted internally with a PTC (positive thermal coefficient) device or the like to shut down the cell in case the cell is exposed to abusive conditions such as short circuit discharge or overheating.

The electrolyte used in a primary $Li/FeS_2$ cells is formed of a "lithium salt" dissolved in an "organic solvent". Representative lithium salts which may be used in electrolytes for $Li/FeS_2$ primary cells are referenced in related art, for example, as in U.S. Pat. No. 5,290,414 and include such salts as: Lithium trifluoromethanesulfonate, $LiCF_3SO_3$ (LiTFS); lithium bistrifluoromethylsulfonyl imide, $Li(CF_3SO_2)_2N$ (LiTFSI); lithium iodide, LiI; lithium bromide, LiBr; lithium tetrafluoroborate, $LiBF_4$; lithium hexafluorophosphate, $LiPF_6$; lithium hexafluoroarsenate, $LiAsF_6$; $Li(CF_3SO_2)_3C$, and various mixtures. In the art of $Li/FeS_2$ electrochemistry lithium salts are not always interchangeable as specific salts work best with specific electrolyte solvent mixtures, and specific solvent mixtures with certain lithium salts can lead to significantly improved performance.

In U.S. Pat. No. 5,290,414 (Marple) is reported use of a beneficial electrolyte for $FeS_2$ cells, wherein the electrolyte comprises a lithium salt dissolved in a solvent comprising 1,3-dioxolane (DX) in admixture with a second solvent which is an acyclic (non cyclic) ether based solvent. The acyclic (non cyclic) ether based solvent as referenced may be dimethoxyethane (DME), ethyl glyme, diglyme and triglyme, with the preferred being 1,2-dimethoxyethane (DME). As given in the example the dioxolane and 1,2-dimethoxyethane (DME) are present in the electrolyte in substantial amount, i.e., 50 vol % 1,3-dioxolane (DX) and 40 vol % dimethoxyethane (DME) or 25 vol % 1,3-dioxolane (DX) and 75 vol.% dimethoxyethane (DME)(col. 7, lines 47-54). A specific lithium salt ionizable in such solvent mixture(s), as given in the example, is lithium trifluoromethane sulfonate, $LiCF_3SO_3$. Another lithium salt, namely lithium bistrifluoromethylsulfonyl imide, $Li(CF_3SO_2)_2N$ is also mentioned at col. 7, line 18-19. The reference teaches that a third solvent may optionally be added selected from 3,5-dimethylisoxazole (DMI), 3-methyl-2-oxazolidone, propylene carbonate (PC), ethylene carbonate (EC), butylene carbonate (BC), tetrahydrofuran (THF), diethyl carbonate (DEC), ethylene glycol sulfite (EGS), dioxane, dimethyl sulfate (DMS), and sulfolane (claim 19), with the preferred being 3,5-dimethylisoxazole.

In U.S. Pat. No. 6,218,054 (Webber) is disclosed an electrolyte solvent system wherein dioxolane-based solvent and dimethoxyethane-based solvent are present in a weight ratio of about 1:3 (1 part by weight dioxolane to 3 parts by weight dimethoxyethane).

In U.S. Pat. No. 6,849,360 B2 (Marple) is disclosed an electrolyte for an $Li/FeS_2$ cell, wherein the electrolyte comprises the salt lithium iodide dissolved in the organic solvent mixture comprising 1,3-dioxolane (DX), 1,2-dimethoxyethane (DME), and small amount of 3,5 dimethylisoxazole (DMI). (col. 6, lines 44-48.)

In US 2007/0202409 A1 (Yamakawa) it is stated with reference to the electrolyte solvent for the $Li/FeS_2$ cell at para. 33: "Examples of the organic solvent include propylene carbonate, ethylene carbonate, 1,2-dimethoxy ethane, γ-butyrolactone, tetrahydrofuran, 2-methyltetrahydrofuran, 1,3-dioxolane, sulfolane, acetonitrile, dimethyl carbonate, and dipropyl carbonate, and any one of them or two or more of them can be used independently, or in a form of a mixed solvent." Such statement is misleading, since the art teaches only specific combinations of electrolyte solvents will be workable for the $Li/FeS_2$ cell depending on the particular lithium salt to be dissolved in the solvent. (See, e.g. above U.S. Pat. Nos. 5,290,414 and 6,849,360) The reference Yamakawa does not teach which combination of solvents from the above list are to be used with any given lithium salt.

In U.S. 2006/0046152 (Webber) is disclosed an electrolyte system for a lithium cell which may have a cathode comprising $FeS_2$ and FeS therein. The disclosed electrolyte contains lithium iodide salt dissolved in a solvent system comprising a mixture of 1,2-dimethoxypropane and 1,2-dimethoxyethane.

The choice of a particular organic solvent or mixture of different organic solvents for use in conjunction with any one or more lithium salts to produce a suitable electrolyte for the $Li/FeS_2$ cell is challenging. This is not to say that the cell with various combinations of lithium salt and solvent mixtures may not work at all, but it may not work well enough to be practical. The challenge associated with such cells using an electrolyte formed with just any combination of lithium salt and known organic solvent suitable for dissolution and ionization of the salt is that the problems encountered will likely be very substantial, thus making the cell impractical for commercial usage. The history of development of lithium cells in general, whether lithium primary cells, e.g. non rechargeable $Li/MnO_2$ or $Li/FeS_2$ cells or rechargeable lithium or lithium ion cells reveals that just any combination of lithium salt and organic solvent cannot be expected to result in a good cell, that is, exhibiting good, reliable performance. Thus, references which merely provide long lists of possible organic solvents for $Li/FeS_2$ cells do not necessarily teach combinations of solvents or combination of specific lithium salts in specific solvent mixtures, which exhibit particular or unexpected benefit.

Accordingly, it is desired to produce a $Li/FeS_2$ cell employing an effective electrolyte therein which promotes ionization of the lithium salt in the electrolyte and is sufficiently stable that it does not degrade with time and does not degrade the anode or cathode components.

It is desired that the electrolyte comprising a lithium salt dissolved in an organic solvent provide for good ionic mobility of the lithium ions through the electrolyte so that the lithium ions may pass at good transport rate from anode to cathode through the separator.

It is desired to produce a primary (nonrechargeable) $Li/FeS_2$ cell having good rate capability that the cell may be used in place of rechargeable batteries to power digital cameras.

SUMMARY OF THE INVENTION

The invention is directed to lithium primary cells wherein the anode comprises lithium metal. The lithium may be alloyed with small amounts of other metal, for example aluminum, which typically comprises less than about 1 or 2 wt. % of the lithium alloy. The lithium which forms the anode active material, is preferably in the form of a thin foil. The cell has a cathode comprising the cathode active material iron disulfide ($FeS_2$), commonly known as "pyrite". The cell may be denoted a $Li/FeS_2$ cell. The cathode active material $FeS_2$ is dischargeable, that is, participates in a useful electrochemical reaction in order to produce useful electrical energy when the cell is used in normal service. The invention is directed to an improved electrolyte for the cell. The electrolyte of the invention is also useful in lithium primary cells having cathodes comprising iron disulfide ($FeS_2$) and compatible coactive material such as iron sulfide (FeS) particles in admixture therein.

The lithium primary cell of the invention has an anode comprising lithium or lithium alloy as anode active material and a cathode comprising iron disulfide ($FeS_2$) particles or mixtures of iron disulfide ($FeS_2$) and iron sulfide (FeS) particles as cathode active material. The cell may be in the form of a flat coin or button cell or in the form of a cylindrical cell. The anode and cathode may be spirally wound with a separator sheet therebetween to form an electrode assembly which is inserted into a cylindrical casing. The improved electrolyte solution of the invention is added to the cell after the wound electrode assembly is inserted into the cell casing. The electrolyte typically comprises a lithium salt dissolved in an organic solvent mixture. A preferred electrolyte solution of the invention comprises a mixture of lithium iodide (LiI) salt dissolved in an electrolyte solvent mixture of dioxolane (DX), dimethoxyethane (DME), and the solvent additive isosorbide dimethyl ether (IDE). The isosorbide dimethyl ether (IDE) comprises at least 2 percent by weight of the electrolyte solvent mixture. Desirably the isosorbide dimethyl ether (IDE) comprises between about 2 and 15 percent by weight, desirably between about 5 and 15 percent by weight of the electrolyte solvent mixture. A small amount of 3,5-dimethylisoxazole (DMI), typically between about 0.1 and 5 percent by weight, typically between about 0.1 and 1 percent by weight, may be added to retard dioxolane polymerization and to react with undesired materials on the cathode. The dioxolane is preferably 1,3-dioxolane. It shall be understood that the term dioxolane may include alkyl substituted dioxolanes. The preferred dimethoxyethane is 1,2-dimethoxyethane. The lithium iodide (LiI) may be at a concentration of between about 0.1 and 1.2 Molar (moles per liter), preferably between about 0.5 and 1.2 moles per liter, desirably about 0.8 moles per liter, in the total electrolyte.

The isosorbide dimethyl ether (IDE) solvent additive of the invention is desirably present in the electrolyte solvent mixture in amount between about 2 and 15 percent by weight, desirably between about 5 and 15 percent by weight, typically about 5 percent by weight. The dioxolane, preferably 1,3-dioxolane, comprises between about 50 and 90 percent by weight, preferably between about 60 and 80 percent by weight of the electrolyte solvent mixture. The dimethoxyethane, preferably 1,2-dimethoxyethane, comprises between about 10 and 50 percent by weight, preferably between about 20 and 40 percent by weight of the electrolyte solvent mixture. The 3,5-dimethylisoxazole comprises between about 0.1 and 5 percent by weight, typically between about 0.1 and 1 percent by weight.

The isosorbide dimethyl ether is believed to help envelop and thereby protect the lithium ions (Li+) as the lithium ions transport from the anode to cathode through the cell's separator during discharge. It is theorized that the improved enveloping protection afforded the lithium ions by the isosorbide dimethyl ether preserves the ionic state of the lithium ions due to size and believed strong chelating ability of isosorbide dimethyl ether. In particular the isosorbide dimethyl ether prevents lithium ions from strongly associating with iodide ions present in the electrolyte solvent. (Iodide ions are present in the electrolyte solvent solution as the lithium iodide salt becomes dissolved therein.) The protected lithium ions in effect result in more lithium ions available for transport to the cathode and thereby improve the cell's actual service life and discharge capacity.

In a principal aspect the electrolyte formulation of the invention for a Li/FeS$_2$ cell comprises a lithium iodide salt between about 0.5 and 1.2 moles per liter, typically between about 0.8 and 1.2 moles per liter dissolved in an electrolyte solvent mixture comprising dioxolane, dimethyoxyethane, and isosorbide dimethyl ether (IDE). The weight ratio of dioxolane to dimethoxyethane is in a range desirably between about 0.82 and 2.3 as described in commonly assigned U.S. application Ser. No. 12/069,953, filed Feb. 14, 2008. The dioxolane is preferably 1,3-dioxolane but may include alkyl substituted dioxolanes as well. The preferred dimethoxyethane is 1,2-dimethoxyethane, but other glymes also can be employed. The isosorbide dimethyl ether (IDE) content in the electrolyte formulation of the invention comprises greater than about 2 wt % of the electrolyte solvent mixture. Preferably, the isosorbide dimethyl ether (IDE) comprises between about 2 and 15 wt % of the electrolyte solvent mixture, desirably about 5 wt % of the solvent mixture. The dioxolane may be present in amount between about 50 and 90 percent by weight, preferably between about 60 and 80 percent by weight of the electrolyte solvent mixture. The dimethoxyethane, preferably 1,2-dimethoxyethane, comprises between about 10 and 50 percent by weight, preferably between about 20 and 40 percent by weight of the electrolyte solvent mixture. The electrolyte also optionally includes 3,5-dimethylisoxazole (DMI) in amount between about 0.1 and 1 wt. % of the solvent mixture. (The dimethylisoxazole similar to other Lewis bases is helpful in retarding polymerization of dioxolane plus can react with undesired materials on the cathode surface.) The lithium iodide is typically present in the solvent mixture at a concentration of about 0.8 moles per liter. The electrolyte has a viscosity desirably between about 0.5 and 1.5 centipoise, for example, between about 0.8 and 1.5 centipoise.

The invention is directed to lithium primary cells wherein the anode comprises lithium metal. The lithium may be alloyed with small amounts of another metal, for example aluminum, which typically comprises less than about 1 or 2 wt. % of the lithium alloy. The lithium which forms the anode active material, is preferably in the form of a thin foil. The cell has a cathode comprised of the cathode active material iron disulfide (FeS$_2$), commonly known as "pyrite". The cell may be in the form of a button (coin) cell or flat cell. Desirably the cell may be in the form of a spirally wound cell comprising an anode sheet and a cathode composite sheet spirally wound with separator therebetween. The cathode sheet is produced using a slurry process to coat a cathode mixture comprising iron disulfide (FeS$_2$) and carbon particles onto a substrate, preferably a conductive metal substrate. The FeS$_2$ and carbon particles are bound to the substrate using desirably an elastomer, preferably, a styrene-ethylene/butylene-styrene (SEBS) block copolymer such as KRATON G1651 elastomer (Kraton Polymers, Houston, Tex.). This polymer is a film-former, and possesses good affinity and cohesive properties for the FeS$_2$ particles as well as for conductive carbon particle additives in the cathode mixture. The polymer resists chemical attack by the electrolyte.

The cathode is formed from a cathode slurry comprising iron disulfide (FeS$_2$) powder, conductive carbon particles, binder material, and solvent. (The term "slurry" as used herein will have its ordinary dictionary meaning and thus be understood to mean a wet mixture comprising solid particles in dispersion or suspension.) The wet cathode slurry is coated onto a substrate which is preferably a conductive sheet such as a sheet of aluminum or stainless steel. The substrate (conductive sheet) may have perforations or apertures therethrough or may be a solid sheet without perforations. The cathode slurry is coated onto at least one side, preferably both sides of the substrate and then dried. Both coated sides of the substrate may be dried at the same time. Alternatively, one side of the substrate may be coated with cathode slurry, then dried, followed by coating the opposite side of the substrate and then drying this opposite side. The cathode slurry coatings on the substrate are dried to evaporate the solvent leaving a cathode composite formed of a dry cathode coating mixture comprising the iron disulfide material (including any iron sulfide, if also added) and carbon particles preferably including carbon black with the dry coating bound, preferably to the both sides of the substrate. An electrode assembly is then formed comprising a sheet of lithium or lithium alloy, the cathode composite sheet, and separator therebetween. The electrode assembly is preferably spirally wound and inserted into the cell casing. The electrolyte solution is then poured into the cell casing and the edge of the cell casing crimped over an end cap to close the cell.

Alternatively, the cathode slurry may include cathode active material comprising iron disulfide ($FeS_2$) and an another coactive (dischargeable) material therein, preferably iron sulfide (FeS) as disclosed in commonly assigned U.S. patent application Ser. No. 12/148,030 filed Apr. 16, 2008. In that case the iron sulfide (FeS) content in the cathode may comprises between about 5 and 30 percent by weight of the total $FeS_2$ plus FeS in the cathode. The $FeS_2$ may have an average particle size between about 20 and 35 micron and the FeS has an average particle size typically between about 5 and 15 micron. The cathode slurry may then be formed of a mixture of iron disulfide ($FeS_2$) and iron sulfide (FeS) particles, conductive carbon particles, binder material, and solvent. The cathode slurry is then coated onto one or both sides of a substrate (conductive substrate), desirably a sheet of aluminum or stainless steel. The coatings on the substrate are dried to evaporate the solvent leaving a cathode composite sheet formed of a dry cathode coating mixture comprising the iron disulfide ($FeS_2$) and iron sulfide (FeS) material and carbon particles bound to the substrate surface. An electrode assembly is then formed comprising a sheet of lithium or lithium alloy, the cathode composite sheet, and separator therebetween. The electrode assembly is preferably spirally wound and inserted into the cell casing. The electrolyte solution of the invention is then poured into the cell casing and the edge of the cell casing crimped over an end cap to close the cell. For convenience of notation the lithium cell which contains $FeS_2$ in the cathode can be represented herein as a $Li/FeS_2$ cell and the lithium cell which contains both $FeS_2$ and FeS in the cathode can be represented as a $Li/(FeS_2+FeS)$ cell.

The preferred electrolyte of the invention comprises lithium iodide (LiI) salt dissolved in an electrolyte solvent mixture comprising 1,3-dioxolane, dimethoxyethane, preferably 1,2-dimethoxyethane, and isosorbide dimethyl ether. The electrolyte solvents have the following chemical and structural formulas:

1,3-dioxolane (DX) is a cyclic diether, also classified as a heterocyclic acetal with boiling point 75.6° C., a viscosity of about 0.66 centipoise and a dielectric constant of 6.95 at 25° C. It has a Chemical Abstracts Service Registry No. (CAS) 646-06-0. It has the chemical formula $C_3H_6O_2$ (M.W. 74.08) and the structural formula (I):

(I)

1,2-dimethoxyethane (DME) in the electrolyte is a water white liquid with boiling point 85.2° C., a viscosity of about 0.455 centipoise and a dielectric constant of 7.20. It has a Chemical Abstracts Service Registry CAS No. 110-71-4. 1,2-dimethoxyethane (DME) (also known as ethylene glycoldimethylether) is an acyclic ether (non cyclic ether) organic solvent. It has a chemical formula $C_4H_{10}O_2$ and a structural formula:

(II)

The isosorbide dimethyl ether in the electrolyte has a boiling point of 93-95° C. and a density of 1.15 g/ml at 25° C. It is a cyclic organic solvent having a chemical formula $C_8H_{14}O_4$ (M.W. 174.19) available commercially from Aldrich Chemical Company. It has a Chemical Abstracts Service Registry CAS No. 5306-85-4 and a schematic structural formula:

(III)

The above schematically represented isosorbide dimethyl ether has a CAS No. 5306-85-4 and is a preferred steroisomeric form for use in the electrolyte mixture of the invention. It is an etherified derivative of isosorbide, which is in turn an anhydrized derivative of the sugar alcohol sorbitol. It will be appreciated, however, that isosorbide dimethyl ether is available in two other stereoisomeric forms. The second such stereoisomer has the CAS No. 121693-37-6 and may be referenced in the chemical literature as a stereoisomer of isosorbide dimethyl ether, or alternatively by the chemical name dimethyl isomannide. Dimethyl isomannide is an etherified derivative of isomannide, which is in turn an anhydrized derivative of the sugar alcohol mannitol. The third stereoisomer has the CAS No. 194348-72-6 and may be referenced in the chemical literature as a stereoisomer of isosorbide dimethyl ether, or alternatively by the chemical name dimethyl isoidide. Dimethyl isoidide is an etherified derivative of isoidide, which is in turn an anhydrized derivative of the sugar alcohol iditol.

The isosorbide dimethyl ether stereoisomers all have the same chemical formula and same schematic structural formula as in formula III. However, the physical orientation of the methoxy groups ($CH_3$—O—) to the cyclic rings varies from one stereoisomer to the other, varying between endo (inner) and exo (outer) positioning of the groups in regards to the corresponding ring. Isosorbide dimethyl ether bears one methoxy group in an exo orientation and the other in an endo orientation. Dimethyl isomannide bears both methoxy groups in endo orientations while dimethyl isoidide bears its methoxy groups in exo orientations. All three stereoisomers are similar enough in structure to be expected to lead to comparable properties in the corresponding electrolytes. Thus, it shall be understood that chemical name isosorbide dimethyl ether as used herein and the claims, unless otherwise indicated, is intended to apply to any one or all of isosorbide dimethyl ether and its stereoisomers. Other alkyl and similar groups can potentially be used to replace the methyl groups on the terminal ethers of isosorbide dimethyl ether and its stereoisomers, which may lead to similar or improved chelation effects.

The additive 3,5-dimethylisoxazole has a boiling point between about 142-144° C., a density of 0.99 g/ml at 25° C. The 3,5-dimethylisoxazole (DMI) in amount between about 0.1 and 1 wt. % of the solvent mixture is added primarily to retard the rate of dioxolane polymerization and to react with cathode impurities. It has a chemical formula $C_5H_7NO$ and a structural formula:

(IV)

Instead of 3,5-dimethylisoxazole the solvent additive may be selected from pyridine, an alkylpyrazole, preferably 1,3,5-trimethylpyrazole (TMP) ($C_6H_{10}N_2$) or an alkylimidazole, preferably 1,2-dimethyimidazole (DI) ($C_5H_8N_2$). These additives are referenced in copending commonly assigned U.S. application Ser. No. 12/070,924 filed Feb. 22, 2008 and application Ser. No. 12/214,825, filed Jun. 23, 2008. Such solvent additive to the electrolyte for the $Li/FeS_2$ cell retards the rate of dioxolane polymerization. The solvent additive may comprise between about 0.2 and 5.0 percent by volume, typically between about 0.2 and 1.0 percent by volume of the total solvent mixture.

The water content in the electrolyte of the invention for the $Li/FeS_2$ (or $Li/(FeS_2+FeS)$ cell) may typically be less than about 100 parts water per million parts total electrolyte. However, water content in the total electrolyte may be greater than 100 ppm. Also it is believed that water (deionized) may be added to the electrolyte solvents so that the water content in the electrolyte for the $Li/FeS_2$ cell (or $Li/FeS_2+FeS$ cell) may be up to about 1000 ppm and even up to about 2000 ppm. (See commonly assigned patent application Ser. No. 12/009,858, filed Jan. 23, 2008.) Thus it is believed that the water content in the electrolyte of the present invention may be between about 100 and 1000 ppm, for example, between about 500 and 1000 ppm, or between about 600 and 1000 ppm and up to about 2000 ppm, for example, between about 600 and 2000 ppm. A preferred level of water content in the electrolyte is between about 100 and 500 ppm.

DETAILED DESCRIPTION

Figure 1:
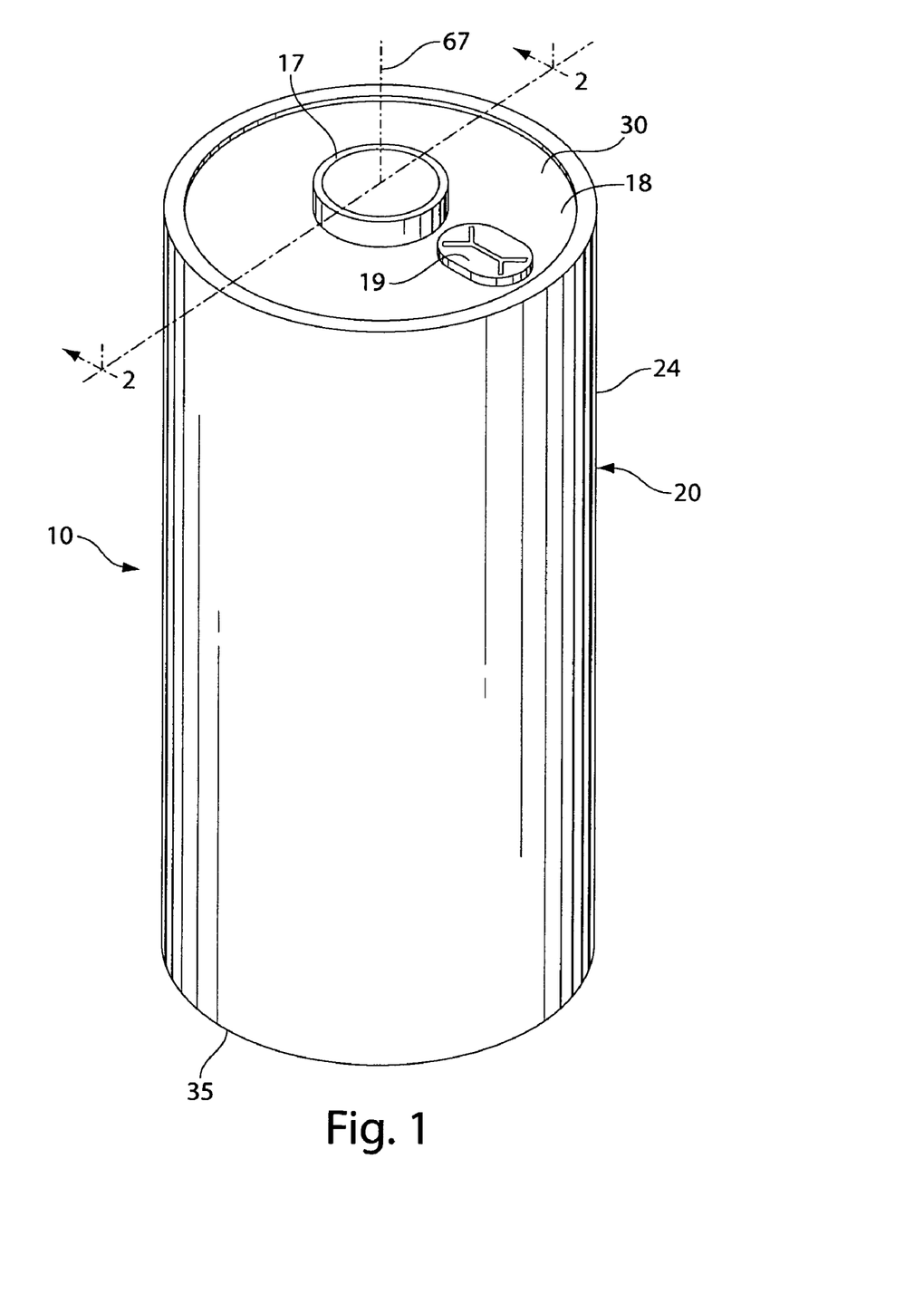
FIG. 1 is an isometric view of an improved $Li/FeS_2$ cell of the invention as presented in a cylindrical cell embodiment.

The $Li/FeS_2$ cell of the invention may be in the form of a flat button cell 100 or a spirally wound cell 10. A button (coin) cell 100 configuration for use as a testing cell comprises a lithium anode 150 and a cathode 170 comprising iron disulfide ($FeS_2$) with separator 160 therebetween as shown in the FIG. 1A.

The $Li/FeS_2$ cell as in cell 100 has the following basic discharge reactions (one step mechanism):

Anode:

Eq. 1

Cathode:

Eq. 2

Overall:

Eq. 3

Figure 1A:
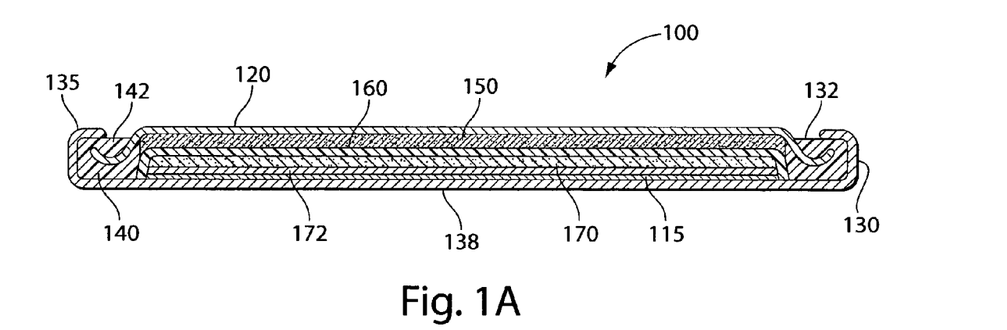
FIG. 1A is a cross sectional view of an improved $Li/FeS_2$ cell of the invention as presented in a button cell embodiment.

The $Li/FeS_2$ button cell 100 shown in FIG. 1A was used as the experimental testing vehicle in the form of a primary (nonrechargeable) cell. By "nonrechargeable" is meant that the cell is intended to be discarded after it has been discharged. In the button cell 100 (FIG. 1A) a disk-shaped cylindrical cathode housing 130 is formed having an open end 132 and a closed end 138. Cathode housing 130 is preferably formed from nickel-plated steel. An electrical insulating member 140, preferably a plastic cylindrical member having a hollow core, is inserted into housing 130 so that the outside surface of insulating member 140 abuts and lines the inside surface of housing 130. Optionally, the inside surface of housing 130 may be coated with a polymeric material that solidifies and may bond with insulator 140. Insulator 140 can be formed from a variety of thermally stable insulating materials, for example polypropylene.

A cathode current collector 115 comprising a metallic grid can be inserted into the cell so that it abuts the inside surface of the closed end 138 of the housing 130. The cathode current collector 115 may desirably be composed of a sheet of expanded stainless steel metal foil, having a plurality of openings therein, thus forming a stainless steel grid or screen. The expanded stainless steel metal foil is available as EXMET foil 316L-SS from Dexmet Corp. Preferably, however, the cathode current collector 115 is composed of a sheet of aluminum, which is more conductive. (The cathode current collector 115 may be a sheet of aluminum alloyed with common aluminum alloy metals such as magnesium, copper, and zinc.) Such aluminum current collector sheet 115 may also have a plurality of small openings therein, thus forming an aluminum grid. The cathode current collector 115 can be welded onto the inside surface of the closed end 138 of the housing 130. (Optionally, the same type of current collector grid, preferably of expanded stainless steel metal foil with openings therein, may also be welded to the inside surface of the closed end of the anode cover 120.) An optional conductive carbon base layer 172 comprising a mixture of graphite and polytetrafluoroethylene (PTFE) binder can be compressed into the cathode current collector 115. The cathode 170 comprising the $FeS_2$ active particles may then be pressed into such conductive base layer 172. This may be termed a "staged" cathode construction.

Figure 1B:
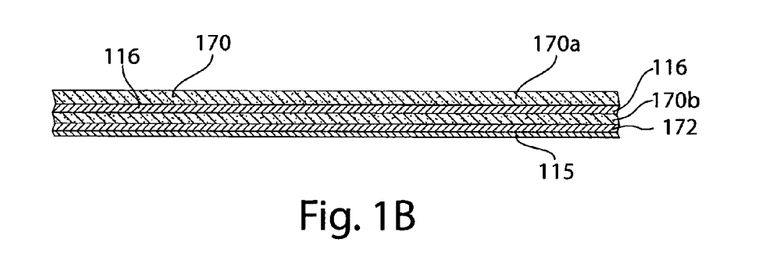
FIG. 1B is a cross sectional view of an improved $Li/FeS_2$ cell of the invention in a button cell embodiment as in FIG. 1A, but with both sides of the metal substrate sheet coated with cathode material.

The cathode 170 comprising iron disulfide ($FeS_2$) or any mixture including iron disulfide ($FeS_2$) as active cathode material, may thus be inserted over optional conductive base layer 172, which in turn overlies the current collector sheet 115 (FIG. 1A). The current collector sheet 115 may be welded directly to the closed end 138 of the housing 130. The cathode active material, that is, the material undergoing useful electrochemical reactions, in cathode 170 can be composed entirely of iron disulfide ($FeS_2$) or may also include compatible coactive material such as iron sulfide (FeS). In preparing the experimental test cells the cathode 170 comprising iron disulfide (FeS$_2$) powder dispersed therein can be prepared in the form of a slurry which may be coated on both sides of a conductive metal foil, preferably an aluminum or stainless steel foil 116 as shown in FIG. 1B. In this case one half of the cathode coatings, namely coating 170a, may be coated onto one side of the conductive metal foil 116 and the other half, namely coating 170b, may be coated onto the other side of conductive metal foil 116 (FIG. 1B). The coating side 170b facing separator 160 is dischargeable. Such aluminum or stainless steel foil 116 may have openings therethrough, thus forming a grid or screen. Alternatively only one side of metal foil 116 may be coated with cathode material, namely the side of metal foil 116 facing separator 160. In either case the cathode 170 is inserted in the cell so that it overlies conductive base layer 172.

Alternatively, the cathode 170 comprising iron disulfide (FeS$_2$) powder dispersed therein can be prepared in the form of a slurry which may be coated directly onto a current collector sheet 115 to form a cathode composite. This may eliminate the use of a conductive base layer 172. Preferably conductive sheet 115 is formed of a sheet of aluminum (or aluminum alloy), as above described, and may have a plurality of small apertures therein, thus forming a grid. Alternatively, the conductive sheet 115 may be a sheet of stainless steel, desirably in the form of expanded stainless steel metal foil, having a plurality of small apertures therein.

In a preferred embodiment the cathode slurry comprises 2 to 4 wt % of binder (KRATON G1651 elastomeric binder from Kraton Polymers, Houston Tex.); 50 to 70 wt % of active FeS$_2$ powder; 4 to 7 wt % of conductive carbon (carbon black and graphite); and 25 to 40 wt % of solvent(s). (The carbon black may include in whole or in part acetylene black carbon particles. Thus, the term carbon black as used herein shall be understood to extend to and include carbon black and acetylene black carbon particles.) The KRATON G1651 binder is an elastomeric block copolymer (styrene-ethylene/butylene (SEBS) block copolymer) which is a film-former. This binder possesses sufficient affinity for the active FeS$_2$ and carbon black particles to facilitate preparation of the wet cathode slurry and to keep these particles in contact with each other after the solvents are evaporated. The FeS$_2$ powder may have an average particle size between about 1 and 100 micron, desirably between about 10 and 50 micron. A desirable FeS$_2$ powder is available under the trade designation Pyrox Red 325 powder from Chemetall GmbH, wherein the FeS$_2$ powder has a particle size sufficiently small that of particles will pass through a sieve of Tyler mesh size 325 (sieve openings of 0.045 mm). (The residue amount of FeS$_2$ particles not passing through the 325 mesh sieve is 10% max.)

A suitable graphite is available under the trade designation TIMREX KS6 graphite from Timcal Ltd. TIMREX graphite is a highly crystalline synthetic graphite. (Other graphites may be employed selected from natural, synthetic, or expanded graphite and mixtures thereof, but the TIMREX graphite is preferred because of its high purity.) The carbon black is available under the trade designation Super P conductive carbon black (acetylene black, BET surface of 62 m$^2$/g) from Timcal Co.

The solvents forming the wet cathode slurry may desirably include a mixture of C$_9$-C$_{11}$ (predominately C$_9$) aromatic hydrocarbons available as SHELL SOL A100 hydrocarbon solvent (Shell Chemical Co.) and a mixture of primarily isoparaffins (average M.W. 166, aromatic content less than 0.25 wt. %) available as SHELL SOL OMS hydrocarbon solvent (Shell Chemical Co.). The weight ratio of SHELL SOL A100 to SHELL SOL OMS solvent is desirably at a 4:6 weight ratio. The SHELL SOL A100 solvent is a hydrocarbon mixture containing mostly aromatic hydrocarbons (over 90 wt % aromatic hydrocarbon), primarily C$_9$ to C$_{11}$ aromatic hydrocarbons. The SHELL SOL OMS solvent is a mixture of isoparaffin hydrocarbons (98 wt. % isoparaffins, M.W. about 166) with less than 0.25 wt % aromatic hydrocarbon content. The slurry formulation may be dispersed using a double planetary mixer. Dry powders are first blended to ensure uniformity before being added to the binder solution in the mixing bowl.

A preferred cathode slurry mixture is presented in Table 1:

TABLE I

| Cathode Composition | | |
| --- | --- | --- |
| | Wet Cathode Slurry (wt. %) | Dry Cathode (wt. %) |
| Binder (KRATON G1651) | 2.0 | 3.01 |
| Hydrocarbon Solvent | | |
| (ShellSol A100) | 13.4 | 0.0 |
| (ShellSol OMS) | 20.2 | 0.0 |
| FeS$_2$ Powder (Pyrox Red 325) | 58.9 | 88.71 |
| Graphite (Timrex KS6) | 4.8 | 7.23 |
| Acetylene Carbon Black (Super P) | 0.7 | 1.05 |
| Total | 100.0 | 100.00 |

In one embodiment the wet cathode slurry may be applied directly to current collector substrate 115 using intermittent roll coating technique. This same or similar wet cathode slurry mixture (electrolyte not yet added to the cell) is disclosed in commonly assigned application Ser. No. 11/516, 534 (US2008-0057403 A1). The total solids content of the wet cathode slurry mixture as shown in above Table 1 is 66.4 wt. %.

As above indicated current collector substrate 115 is preferably an aluminum foil, which may optionally be precoated with a carbon base layer 172 before the wet cathode slurry is applied. The cathode slurry coated on the metal substrate 115 is dried gradually adjusting or ramping up the temperature from an initial temperature of 40° C. to a final temperature of about 130° C. in an oven until the solvent has all evaporated. (Drying the cathode slurry in this manner avoids cracking.) This forms a dry cathode coating comprising FeS$_2$, carbon particles, and binder on the metal substrate 115. The coated metal substrate 115 is then passed between calendering rolls to obtain the desired cathode 170 thickness.

For purposes of producing a coin cell 100 (FIG. 1A) for use in experiments reported herein, both sides of an aluminum foil 116 were coated with cathode slurry and dried to form dry cathode 170. In this case the cathode 170 comprised a coating 170a on one side of the aluminum foil 116 and same coating 170b on the opposite side of aluminum foil 116 (FIG. 1B). The wet coatings on foil 116 were then dried. The dried cathode coatings on foil 116 were calendered to form a dry cathode 170. A representative desirable thickness of dry cathode 170 is between about 0.172 and 0.188 mm, preferably about 0.176 mm which includes the 20 micron thick aluminum foil 116. The flatness and uniformity of thickness of the dry cathode 170 is easier to achieve when both sides of foil 116 is coated in this manner. However, since the foil 116 used in the cell experiments was a solid sheet of aluminum (without perforation) it will be appreciated that only dry cathode coating 170a discharges. (The dry cathode coating 170b on the opposite side of foil 116 faces away from separator 160 and anode 150 when dry cathode 170 is inserted into housing 130 and thus does not discharge). The dry cathode coating has the following desirable formulation: $FeS_2$ powder (88.7 wt. %); Binder (KRATON G1651), 3 wt. %; Graphite (Timrex KS6), 7.2 wt. %, and Carbon Black (Super P), 1.1 wt %. The carbon black (Super P carbon black) develops a carbon network which improves conductivity.

The cathode composite 170 comprising the dry cathode coatings 170a and 170b on opposite sides respectively of aluminum foil 116 was positioned in the cathode housing 130 over carbon base layer 172, which in turn overlaid cathode current collector 115. A separator sheet 160 preferably comprising a microporous polypropylene was then be inserted over the cathode 170.

The electrolyte for the $Li/FeS_2$ cell was then be added so that it fully penetrates through separator sheet 160 and facing cathode layer 170a. The electrolyte mixture is added so that it becomes absorbed into the separator and facing cathode coating. The electrolyte comprises a lithium salt or mixture of lithium salts dissolved in an organic solvent. The electrolyte mixture is added in amount to thoroughly saturate the cathode 170 and separator 160.

The electrolyte of the invention for the above cell comprises a lithium iodide salt dissolved in an electrolyte solvent mixture comprising dioxolane, dimethoxyethane, and isosorbide dimethyl ether, wherein the weight ratio of dioxolane to dimethoxyethane is in a range between about 0.82 and 9.0, desirably between about 0.82 and 2.3. The dioxolane, preferably 1,3-dioxolane, comprises between about 50 and 90 percent by weight, preferably between about 60 and 80 percent by weight of the electrolyte solvent mixture. The dimethoxyethane, preferably 1,2-dimethoxyethane, comprises between about 10 and 50 percent by weight, preferably between about 20 and 40 percent by weight of the electrolyte solvent mixture. The isosorbide dimethyl ether (IDE) solvent additive of the invention is desirably present in the electrolyte solvent mixture in amount between about 2 and 15 percent by weight, desirably between about 5 and 15 percent by weight, typically about 5 percent by weight. The weight ratio of isosorbide dimethyl ether to dioxolane may desirably be between about 0.03 and 0.21, for example, between about 0.07 and 0.21. The lithium iodide (LiI) may be at a concentration of between about 0.5 and 1.2 Molar (moles per liter), desirably about 0.8 moles per liter, in the total electrolyte.

The dioxolane is preferably 1,3-dioxolane but may include alkyl-substituted dioxolanes as well. The preferred dimethoxyethane is 1,2-dimethoxyethane. The isosorbide dimethyl ether preferably comprises greater than about 2 wt % of the electrolyte solvent mixture. Preferably, the isosorbide dimethyl ether comprises between about 2 and 15 wt % the solvent mixture, desirably between about 5.0 and 15 wt. % of the electrolyte solvent mixture. The electrolyte has a viscosity desirably between about 0.8 and 1.5 centipoise.

A layer of anode material 150, typically a sheet of lithium or lithium alloy may then be placed over separator sheet 160. The anode cover 120, formed preferably from nickel-plated steel, is inserted into open end 132 of housing 130 and peripheral edge 135 of housing 130 is crimped over the exposed insulator edge 142 of insulating member 140. The peripheral edge 135 bites into insulator edge 142 closing housing 130 and tightly sealing the cell contents therein. The anode cover 120 also functions as the negative terminal of the cell and housing 130 at the closed end 138 functions as the positive terminal of the cell.

In another embodiment the $Li/FeS_2$ cell may be in the configuration of a cylindrical cell 10 as shown in FIG. 1. The cylindrical cell 10 may have a spirally wound anode sheet 40, cathode 60 with separator sheet 50 therebetween as shown in FIGS. 2-5. The cell 10 internal configuration, apart from the difference in cathode composition, may be similar to the spirally wound configuration shown and described in U.S. Pat. No. 6,443,999. The anode sheet 40 as shown in the figures comprises lithium metal and the dry cathode sheet 60 comprises, for example, $FeS_2$ powder, (88.7 wt. %); Binder (KRATON G1651), 3 wt. %; Graphite (Timrex KS6), 7.2 wt. %, and Carbon Black (Super P), 1.1 wt %. The carbon black (Super P carbon black) develops a carbon network which improves conductivity. The cell is preferably cylindrical as shown in the figures and may be of any size, for example, AAAA (42×8 mm), AAA (44×9 mm), AA (49×12 mm), C (49×25 mm) and D (58×32 mm) size. Thus, cell 10 depicted in FIG. 1 may also be a ⅔ A cell (35×15 mm).

Figure 3:
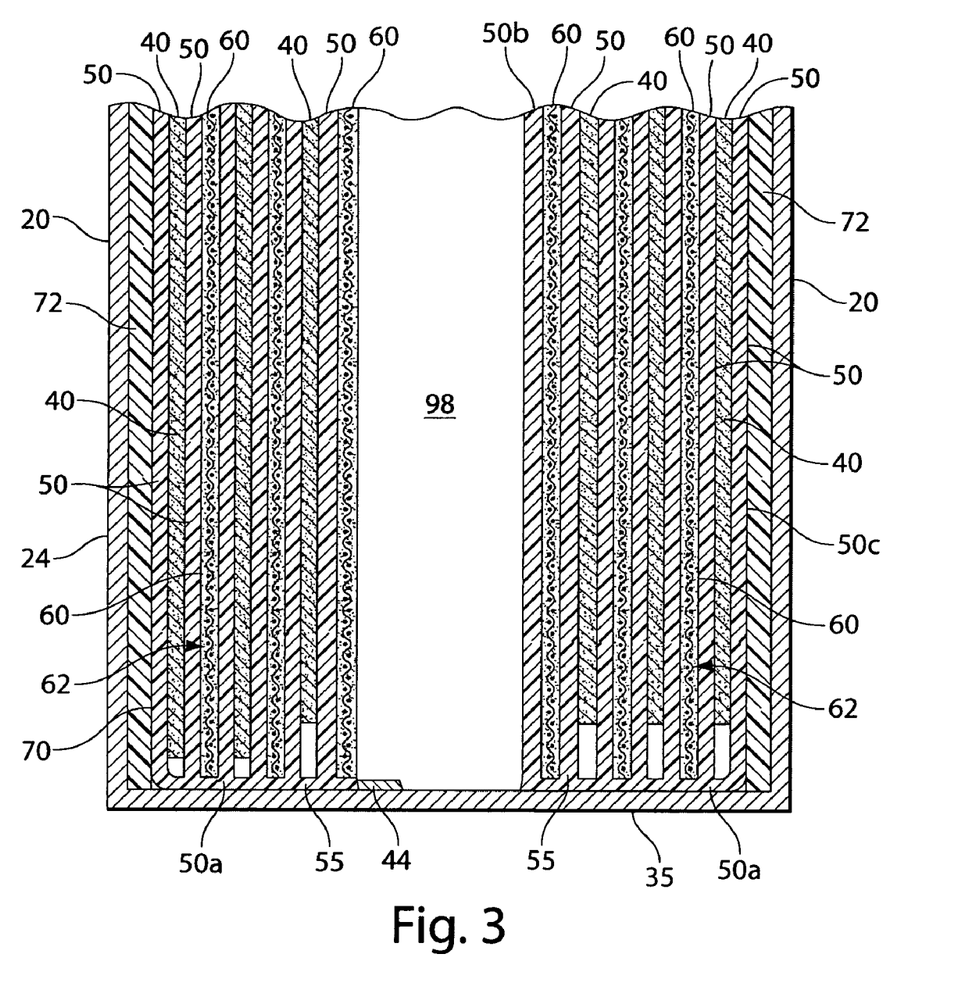
FIG. 3 is a partial cross sectional elevation view of the cell taken through sight lines 2-2 of FIG. 1 to show a spirally wound electrode assembly.
Figure 4:
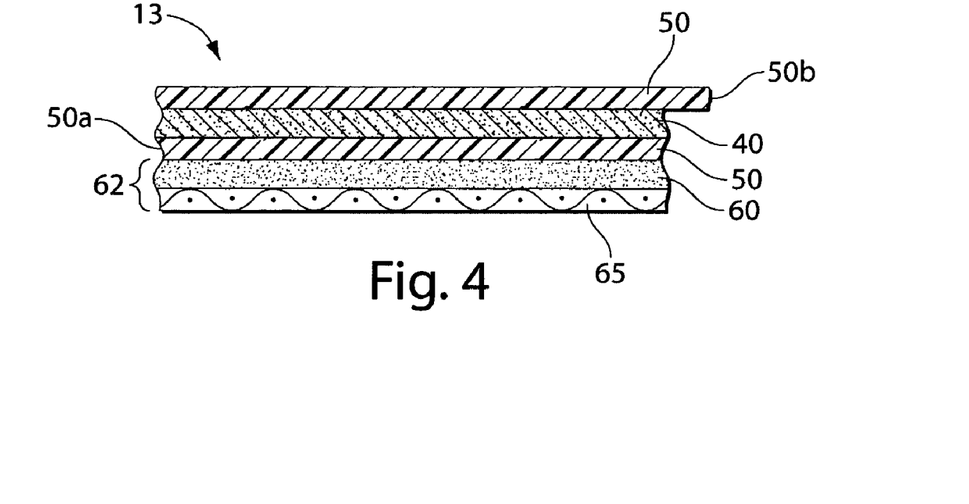
FIG. 4 is a schematic showing the placement of the layers comprising the electrode assembly.
Figure 5:
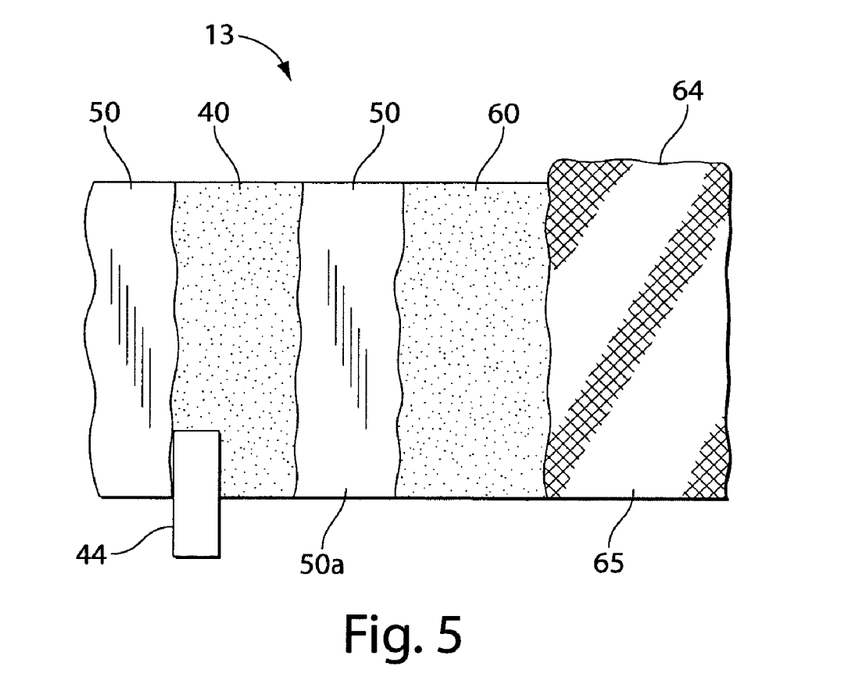
FIG. 5 is a planar view of the electrode assembly of FIG. 4 with each of the layers thereof partially peeled away to show the underlying layer.

For a spirally wound cell 10, a preferred shape of the cell casing (housing) 20 is cylindrical as shown in FIG. 1. Cylindrical cell 10 has a central longitudinal axis 67. A similar wound cell structural configuration for a lithium cell but employing $FeS_2$ as cathode active material is also shown and described in commonly assigned patent application Ser. No. 11/516,534 (US2008-0057403 A1). Casing 20 is preferably formed of nickel plated steel. The cell casing 20 (FIG. 1) has a continuous cylindrical surface. The spiral wound electrode assembly 70 (FIG. 3) comprising anode 40 and cathode composite 62 with separator 50 therebetween can be prepared by spirally winding a flat electrode composite 13 (FIGS. 4 and 5). Cathode composite 62 comprises a layer of cathode 60 comprising iron disulfide ($FeS_2$) coated onto metallic substrate 65 (FIG. 4).

The electrode composite 13 (FIGS. 4 and 5) can be made in the following manner: The cathode 60 can be initially prepared in the form of a wet slurry of composition, for example, as in Table 1. The cathode slurry is coated onto a conductive substrate sheet or metal foil 65. The conductive substrate 65 may be a sheet of aluminum or stainless steel, for example, expanded metal foil of aluminum or stainless steel (FIG. 4). If an aluminum sheet 65 is used it may be a solid sheet of aluminum without openings therethrough or may be a sheet of expanded aluminum foil (EXMET expanded aluminum foil) with openings therethrough thus forming a grid or screen. (EXMET aluminum or stainless steel foil from Dexmet Company, Branford, Conn.). The apertures in conductive substrate sheet 65 may also be the result of punching or piercing holes therein. The expanded metal foil may have a basis weight of about 0.024 $g/cm^2$ forming a mesh or screen with openings therein. Typically the aluminum sheet 65 may have a thickness between about 0.015 and 0.040 mm.

The wet cathode slurry mixture having the composition as shown above in Table 1 comprising iron disulfide ($FeS_2$), binder, conductive carbon and solvents is prepared by mixing the components shown in Table 1 until a homogeneous mixture is obtained. The above quantities (Table 1) of components of course can be scaled proportionally so that small or large batches of cathode slurry can be prepared. The wet cathode slurry thus preferably has the following composition: iron disulfide powder, 58.9 wt. %; Binder, KRATON G1651 (2 wt. %); Graphite, TIMREX KS6 (4.8 wt %), Actylene Black, Super P (0.7 wt %), Hydrocarbon Solvents, SHELL SOL A100 (13.4 wt %) and ShelSol OMS (20.2 wt %). It will be appreciated that such specific cathode composition as presented herein is intended as a non-limiting example.

The cathode slurry is coated onto at least one side of a conductive substrate or grid 65, preferably a sheet of aluminum, or stainless steel expanded metal foil. The cathode slurry coated on the metal substrate 65 is dried in an oven preferably gradually adjusting or ramping up the temperature from an initial temperature of 40° C. to a final temperature not to exceed 130° C. for about ½ hour or until the solvent has all evaporated. This forms a dry cathode coating 60 comprising the iron disulfide powder, carbon particles, and binder on the metal substrate 65 and thus forms the cathode composite sheet 62 shown best in FIG. 4. A calendering roller is then applied to the coating to obtain the desired cathode thicknesses. Optionally, the cathode slurry may then also be coated onto the opposite side of the same conductive substrate 65. The cathode slurry coating on the opposite side of substrate 65 is then dried in the same manner as above describe, followed by calendering the dried coating. This results in a cathode composite sheet 62 with dry cathode coating 60 coated on both sides of metal substrate 65.

For an AA size primary cell with lithium anode and cathode comprising iron disulfide, the desired thickness of the dry cathode composite 62 is between about 0.172 and 0.188 mm, preferably between about 0.176 and 0.180 mm, with a cathode coating 60 coated on both sides of aluminum substrate 65. This includes the substrate 65, preferably of aluminum foil, having a thickness of between about 0.015 and 0.040 mm. The dry cathode coating 60 may typically comprise between about 85 and 95 wt. % iron disulfide powder; between about 4 and 8 wt. % conductive carbon; and the remainder of said dry coating comprising binder material. By way of specific example, the dry cathode coating 60 thus has the following desirable formulation: iron disulfide powder (88.7 wt. %); binder, KRATON G1651 elastomer (3.0 wt. %); conductive carbon particles, preferably graphite (7.2 wt. %) available as TIMREX KS6 graphite from Timcal Ltd and conductive carbon black (1.1 wt %) available as Super P conductive carbon black from Timcal. The carbon black develops a carbon network which improves conductivity. Optionally between about 0 and 90 percent by weight of the total carbon particles may be graphite. The graphite if added may be natural, synthetic or expanded graphite and mixtures thereof.

The anode 40 can be prepared from a solid sheet of lithium metal. The anode 40 is desirably formed of a continuous sheet of lithium metal (99.8% pure). Alternatively, the anode 40 can be an alloy of lithium and an alloy metal, for example, an alloy of lithium and aluminum. In such case the alloy metal, is present in very small quantity, preferably less than 1 or 2 percent by weight of the lithium alloy. Upon cell discharge the lithium in the alloy thus functions electrochemically essentially as pure lithium. Thus, the term "lithium or lithium metal" as used herein and in the claims is intended to include in its meaning such lithium alloy. The lithium sheet forming anode 40 does not require a substrate. The lithium anode 40 can be advantageously formed from an extruded sheet of lithium metal having a thickness of desirably between about 0.10 and 0.20 mm desirably between about 0.12 and 0.19 mm, preferably about 0.15 mm for the spirally wound cell.

Individual sheets of electrolyte permeable separator material 50, preferably of microporous polypropylene having a thickness of about 0.025 mm or less, preferably between about 0.008 and 0.025 mm, is inserted on each side of the lithium anode sheet 40 (FIGS. 4 and 5). The microporous polypropylene desirably has a pore size between about 0.001 and 5 micron. The first (top) separator sheet 50 (FIG. 4) can be designated the outer separator sheet and the second sheet 50 (FIG. 4) can be designated the inner separator sheet. The cathode composite sheet 62 comprising cathode coating 60 on conductive substrate 65 is then placed against the inner separator sheet 50 to form the flat electrode composite 13 shown in FIG. 4. The flat composite 13 (FIG. 4) is spirally wound to form electrode spiral assembly 70 (FIG. 3). The winding can be accomplished using a mandrel to grip an extended separator edge 50b (FIG. 4) of electrode composite 13 and then spirally winding composite 13 clockwise to form wound electrode assembly 70 (FIG. 3).

Figure 2:
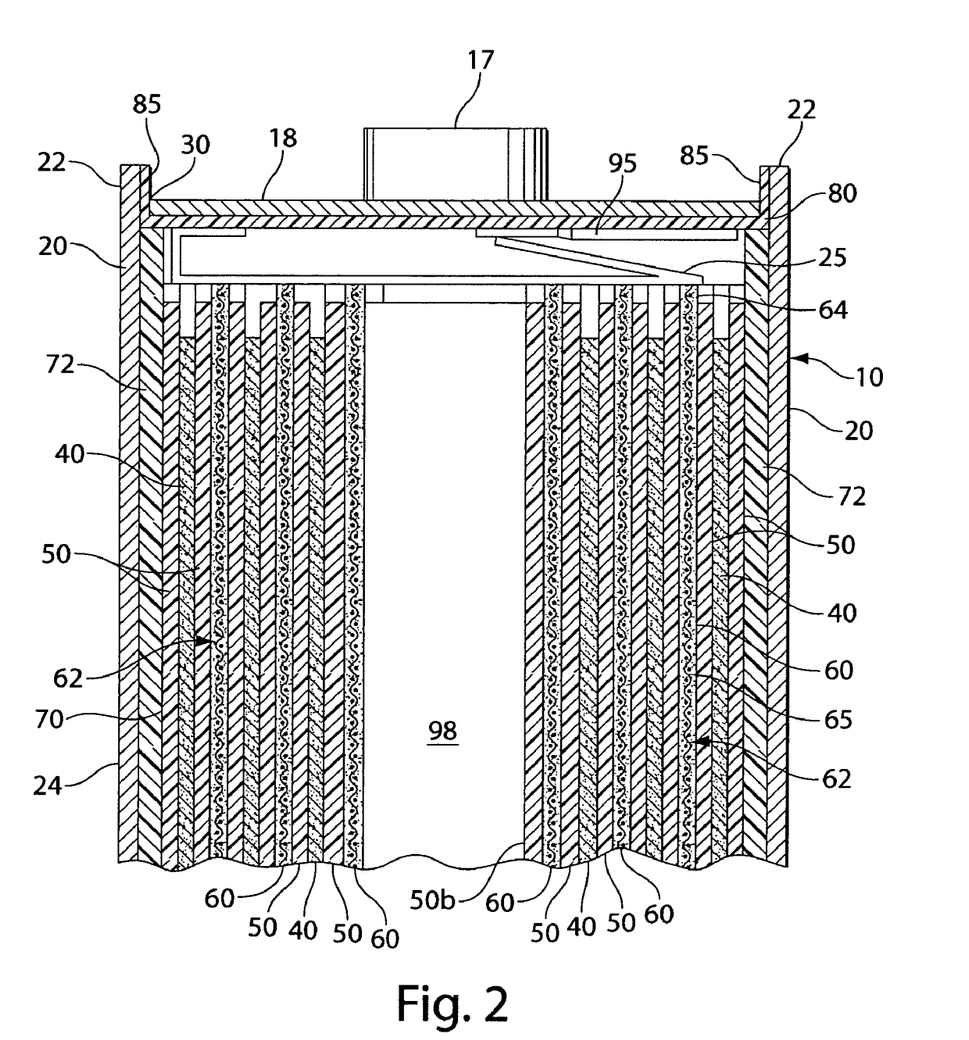
FIG. 2 is a partial cross sectional elevation view of the cell taken through sight lines 2-2 of FIG. 1 to show the top and interior portion of the cell.

When the winding is completed separator portion 50b appears within the core 98 of the wound electrode assembly 70 as shown in FIGS. 2 and 3. By way of non limiting example, the bottom edges 50a of each revolution of the separator may be heat formed into a continuous membrane 55 as shown in FIG. 3 and taught in U.S. Pat. No. 6,443,999. As may be seen from FIG. 3 the electrode spiral 70 has separator material 50 between anode sheet 40 and cathode composite 62. The spirally wound electrode assembly 70 has a configuration (FIG. 3) conforming to the shape of the casing body. Casing 20 has cylindrical body 24 terminating in an open end 30 and opposing closed end 35. The spirally wound electrode assembly 70 is inserted into the open end 30 of casing 20. As wound, the outer layer of the electrode spiral 70 comprises separator material 50 shown in FIGS. 2 and 3. An additional insulating layer 72, for example, a plastic film such as polypropylene tape, can desirably be placed over outside surface 50c of the outer separator layer 50, before the electrode composite 13 is wound. In such case the spirally wound electrode 70 will have insulating layer 72 in contact with the inside surface of casing 20 (FIGS. 2 and 3) when the wound electrode composite is inserted into the casing. Alternatively, the inside surface of the casing 20 can be coated with electrically insulating material 72 before the wound electrode spiral 70 is inserted into the casing.

The electrolyte of the invention may be added to the spirally formed electrode assembly 70 after it has been inserted into the cell casing 20. The electrolyte of the invention for contact with electrode assembly 70 comprises a lithium iodide salt dissolved in an electrolyte solvent mixture comprising dioxolane, dimethoxyethane, dimethylisoxazole, and isosorbide dimethyl ether, wherein the weight ratio of dioxolane to dimethoxyethane is in a range between about 0.82 and 9.0, desirably between about 0.82 and 2.3. The dioxolane, preferably 1,3-dioxolane, comprises between about 50 and 90 percent by weight, preferably between about 60 and 80 percent by weight of the electrolyte solvent mixture. The dimethoxyethane, preferably 1,2-dimethoxyethane, comprises between about 10 and 50 percent by weight, preferably between about 20 and 40 percent by weight of the electrolyte solvent mixture. The isosorbide dimethyl ether (IDE) solvent additive of the invention is desirably present in the electrolyte solvent mixture in amount between about 2 and 15 percent by weight, desirably between about 5 and 15 percent by weight, typically about 5 percent by weight. The lithium iodide (LiI) may be at a concentration of between about 0.5 and 1.2 Molar (moles per liter), desirably about 0.8 moles per liter, in the total electrolyte. The electrolyte is typically added on the basis of about 0.4 gram electrolyte per gram $FeS_2$ in the cathode 60.

The dioxolane is preferably 1,3-dioxolane but may include alkyl-substituted dioxolanes as well. The preferred dimethoxyethane is 1,2-dimethoxyethane. The isosorbide dimethyl ether preferably comprises greater than about 2 wt % of the electrolyte solvent mixture. Preferably, the isosorbide dimethyl ether comprises between about 2 and 15 wt % the solvent mixture, desirably between about 5.0 and 15 wt % of the electrolyte solvent mixture. The electrolyte has a viscosity desirably between about 0.8 and 1.5 centipoise.

An end cap 18 forming the cell's positive terminal 17 may have a metal tab 25 (cathode tab) which can be welded on one of its sides to inside surface of end cap 18. Metal tab 25 is preferably of aluminum or aluminum alloy. A portion of the cathode substrate 65 forms an extended portion 64 extending from the top of the wound spiral as shown in FIG. 2. The extended portion 64 can be welded to the exposed side of metal tab 25 before the casing peripheral edge 22 is crimped around the end cap 18 with peripheral edge 85 of insulating disk 80 therebetween to close the cell's open end 30. End cap 18 desirably has a vent 19 which can contain a rupturable membrane designed to rupture and allow gas to escape if the gas pressure within the cell exceeds a predetermined level. Positive terminal 17 is desirably an integral portion of end cap 18. Alternatively, terminal 17 can be formed as the top of an end cap assembly of the type described in U.S. Pat. No. 5,879,832, which assembly can be inserted into an opening in the surface of end cap 18 and then welded thereto.

A metal tab 44 (anode tab), preferably of nickel can be pressed into a portion of the lithium metal anode 40. Anode tab 44 can be pressed into the lithium metal at any point within the spiral, for example, it can be pressed into the lithium metal at the outermost layer of the spiral as shown in FIG. 5. Anode tab 44 can be embossed on one side forming a plurality of raised portions on the side of the tab to be pressed into the lithium. The opposite side of tab 44 can be welded to the inside surface of the casing either to the inside surface of the casing side wall 24 or more preferably to the inside surface of close end 35 of casing 20 as shown in FIG. 3. It is preferable to weld anode tab 44 to the inside surface of the casing closed end 35, since this is readily accomplished by inserting an electrical spot welding probe (an elongated resistance welding electrode) into the cell core 98. Care should be taken to avoid contacting the welding probe to the separator starter tab 50b which is present along a portion of the outer boundary of cell core 98.

The primary lithium cell 10 may optionally also be provided with a PTC (positive thermal coefficient) device 95 located under the end cap 18 and connected in series between the cathode 60 and end cap 18 (FIG. 2). Such device protects the cell from discharge at a current drain higher than a predetermined level. Thus, if the cell is drained at an abnormally high current, e.g., higher than about 6 to 8 Amp, for a prolonged period, the resistance of the PTC device increases dramatically, thus shutting down the abnormally high drain. It will be appreciated that devices other than vent 19 and PTC device 95 may be employed to protect the cell from abusive use or discharge.

Experimental Test Lithium Button Cells with Cathode Comprising $FeS_2$

Experimental test $Li/FeS_2$ coin cells 100 (FIG. 1A) were prepared as follows:
Experimental Test Cell Assembly:

A coin shaped cathode housing 130 of nickel plated steel and a coin shaped anode housing (cover) 120 of nickel plated steel is formed of a the shape and configuration shown in FIG. 1A. The cathode 170 for the cell 100 was formed of a solid aluminum foil 116 coated on one side with cathode coating 170a and on opposite side with same cathode coating 170b as shown in FIG. 1B. The finished cell 100 had an overall diameter of about 25 mm and a thickness of about 3 mm. The weight of $FeS_2$ in the cathode housing 130 was about 0.13 g which covers both sides of the aluminum foil 116. Since only the cathode coating 170a is accessible for discharge, then the amount of active $FeS_2$ which is actually dischargeable is about 0.065 g. The lithium was supplied in theoretical capacity excess in relation to the cathode.

In forming each cell 100, an Arbor press with a 0.780-inch die was used to punch out two stainless steel grids (316L-SS EXMET expanded metal foil). One stainless steel grid was centered inside of coin cell cathode housing 130 forming cathode current collector sheet 115 which was welded to the closed end 138 of cathode housing 130. The other stainless steel grid (not shown) was resistance welded to the inside surface of closed end of the anode housing (cover) 120. The stainless steel grids were welded to their respective housings using a Hughes opposing tip tweezers welder. The welder was set at 20 watts-seconds and a medium pulse. The welds that were formed were evenly spaced around the perimeters of the grids over intersecting points of mesh strands. For each cell, six to eight welds were formed per grid.

A plastic insulating disk (grommet) 140 was then attached to the edge of anode cover 120 (FIG. 1A). A stainless steel grid (not shown) was welded to the inside surface of the anode cover 120. A lithium disk 150 formed of a sheet of lithium metal having a thickness of 0.032 inch (0.813 mm) was punched out in a dry box using an Arbor press and a 0.75 inch diameter hand punch. The lithium disk 150 forming the cell's anode was then pressed onto the inside surface of anode cover 120 over the stainless steel grid using an Arbor press.

A microporous polypropylene separator 160 (Celgard CG2400 separator from Celgard, Inc.) was cut into eight-inch strips and then was punched out using a hand punch into disks having a diameter of 0.9375 inch and set aside.

Cathode conductive base layer 172 was prepared as follows:

75 g of graphite (Timrex KS6 graphite) and 25 g of tetrafluoroethylene (Teflon) powder were added to a tumbler (with weights) and were left to blend overnight in hood. The contents were added to a blender (~10 g at a time) and were blended on high for 1 minute. The blended contents were poured into a container, labeled, and then stored until ready for use. When ready for application of cathode base layer 172, the cathode housing 130 was placed in a die. The cathode base layer 172 (0.500 g) was impacted onto a stainless steel grid (cathode current collector) 115 by using a ram connected to a Carver hydraulic press. The cathode base layer 172 had the composition of 75 wt % graphite and 25 wt % Teflon powder.

A cathode slurry was then prepared and coated over one side of an aluminum current collector sheet. The components of the cathode slurry comprising iron disulfide ($FeS_2$) were mixed together in the following proportion:

$FeS_2$ powder (58.9 wt. %); Binder, styrene-ethylene/butylene-styrene elastomer (KRATON G1651)(2 wt. %); Graphite (Timrex KS6) (4.8 wt %), Carbon Black (Super P carbon black) (0.7 wt %), Hydrocarbon Solvents, ShellSol A100 solvent (13.4 wt %) and ShellSol OMS solvent (20.2 wt %).

The wet cathode slurry was coated as coating 170a on one side of the aluminum sheet 116 and same coating was coated as coating 170b on the opposite side of aluminum sheet 116. The coated aluminum sheet 116 was then dried in an oven between 40° C. and 130° C. until the solvents in the cathode coatings all evaporated. This formed a dry cathode 170 with dry cathode coatings 170a and 170b comprising $FeS_2$, conductive carbon and elastomeric binder material on both sides of the aluminum sheet 116. The aluminum sheet 116 was an aluminum foil of 20 micron thickness. The dried cathode coatings on each side of the aluminum sheet 116 was calendered to form a dry cathode 170 having a total final thickness of about 0.176 mm, which includes the 20 micron thick aluminum foil. The dry cathode coating 170a and 170b had the following composition:

FeS$_2$ powder (88.71 wt. %); Binder KRATON G1651 elastomer (3.01 wt. %); conductive carbon particles, graphite Timrex KS6 (7.23 wt. %) and carbon black, Super P (1.05 wt %).

The dry cathode 170 (aluminum foil 116 coated on one side with cathode coating 170a and on the other side with like cathode coating 170b) was then die punched into the cathode housing 130 onto carbon base layer 172, which in turn overlaid cathode current collector 115. This was done by placing cathode housing 130 within a die. A cut to size dry cathode 170 (aluminum foil 116 coated on both sides with cathode coating) was then aligned directly over cathode base layer 172 within housing 130. A ram was then inserted into the die holding housing 130, and the die was moved to a hydraulic press. Four metric tons of force was applied using the press to punch cathode 170 into the cathode housing 130 so that it was impacted against cathode base layer 172. The die was then inverted and the housing 130 gently removed from the die. The surface of the exposed cathode layer 170a had a smooth, consistent texture. The finished cathode coin was then placed in a vacuum oven and was heated at 150° C. for 16 hours.

EXPERIMENTAL DATA

A Control Cell Group and Test Cell Group of button (coin) cells 100 were made as described above. The control group of cells 100 had the following electrolyte:

Control Electrolyte:

Lithium iodide (LiI) salt at 0.8 moles/liter was dissolved in a solvent mixture comprising 1,3-dioxolane (DX) (70 wt %), 1,2-dimethoxyethane (DME) (30 wt %) with 0.2 wt. % 3,5-dimethylisoxazole (DMI). That is, the weight ratio of 1,3-dioxolane (DX) to 1,2-dimethoxyethane (DME) was 70/30=2.3. The electrolyte contained less than 100 parts by weight water per million parts by weight (ppm) electrolyte.

The test cell group of cells 100 was identical to the control cells 100 in construction and anode/cathode composition and amount of anode and cathode active material present except that the electrolyte in the test cells was modified to include the isosorbide dimethyl ether solvent additive of the invention. The Test Cell Group of cells 100 had the following modified electrolyte formulation:

Test Electrolyte Formulation of Invention:

Lithium iodide (LiI) salt at 0.8 moles/liter was dissolved in a solvent mixture comprising 1,3-dioxolane (DX) and 1,2-dimethoxyethane (DME) in a weight ratio of DX/DME of 2.3, and 0.2 wt. % 3,5-dimethylisoxazole (DMI) as in the control electrolyte, but with 5 wt. % isosorbide dimethyl ether (IDE) (III) also added. The electrolyte contained less than 100 parts by weight water per million parts by weight (ppm) electrolyte.

Electrochemical Performance of Test Cells and Control Cells:

After the control cells (total 8 cells) and test cells (total 8 cells) had been formed as above described, the discharge capacity of each cell was tested using an accelerated digital camera test that was meant to mimic the use of the cell (to take and view pictures) in a digital camera.

Before the cells were subjected to the accelerated Digicam test they were stored at room temperature for 24 hours and then were predischarged at a constant current drain of 1 milliAmp for 40 minutes. This corresponded to a depth of discharge of about 3 percent of the cell's capacity.

The control cells and test cells were the subjected to an accelerated digital camera test (Digicam test) which consisted of the following pulse test protocol wherein each of the cells was drained by applying pulsed discharge cycles to the cell: Each cycle consisted of both a 6.5 milliwatt pulse for 2 seconds followed immediately by a 2.82 milliwatt pulse for 28 seconds. The cycles are continued until a cutoff voltage of 1.05V is reached. The number of cycles required to reach the cutoff voltage were recorded.

The test cell group achieved a superior performance of an average of 595 pulsed cycles compared to the control cell group which achieved an average of 561 pulsed cycles. Both cell groups were discharged to the same cutoff voltage of 1.05V using the above Digicam test protocol.

Although the invention has been described with reference to specific embodiments, it should be appreciated that other embodiments are possible without departing from the concept of the invention and are thus within the claims and equivalents thereof.

What is claimed is:

1. A primary electrochemical cell comprising a housing; a positive and a negative terminal; an anode comprising at least one of a lithium metal and lithium alloy; a cathode comprising iron disulfide (FeS$_2$) and conductive carbon; said cell further comprising an electrolyte comprising a lithium salt comprising lithium iodide dissolved in a solvent mixture comprising a cyclic diether dioxolane and an additive isosorbide dimethyl ether.

2. The cell of claim 1 wherein said solvent mixture further comprises a non-cyclic ether 1,2-dimethoxyethane.

3. The cell of claim 2 wherein said cyclic diether dioxolane is a 1,3-dioxolane.

4. The cell of claim 3 wherein said solvent mixture comprises between about 50 and 90 percent by weight of the 1,3-dioxolane.

5. The cell of claim 3 wherein the weight ratio of the 1,3-dioxolane to the 1,2-dimethoxyethane is between about 0.82 and 2.3.

6. The cell of claim 1 wherein said solvent mixture comprises between about 2 and 15 percent by weight of the isosorbide dimethyl ether.

7. The cell of claim 1 wherein said solvent mixture comprises between about 5 and 15 percent by weight of the isosorbide dimethyl ether.

8. The cell of claim 1 wherein the lithium iodide is present in said solvent mixture in a concentration of between about 0.5 and 1.2 moles per liter.

9. The cell of claim 1 wherein said electrolyte has a low viscosity of between about 0.8 and 1.5 centipoise.

10. The cell of claim 1 wherein said cathode comprising iron disulfide (FeS$_2$) and conductive carbon is coated onto a substrate sheet comprising aluminum.

11. The cell of claim 1 wherein said conductive carbon comprises a mixture of carbon black and graphite.

12. The cell of claim 1 wherein said anode is in the form of a sheet.

13. The cell of claim 1 wherein said cathode comprising iron disulfide (FeS$_2$) is in the form of a coating bound to a metallic substrate; wherein said anode and said cathode are arranged in spirally wound form with a separator material therebetween.

14. The cell of claim 13 wherein said separator comprises microporous polypropylene.

* * * * *